United States Patent [19]

Nagano

[11] Patent Number: 4,519,791
[45] Date of Patent: May 28, 1985

[54] SPROCKET FOR A BICYCLE
[75] Inventor: Masashi Nagano, Izumi, Japan
[73] Assignee: Shimano Industrial Company Limited, Osaka, Japan
[21] Appl. No.: 525,694
[22] Filed: Aug. 23, 1983
[30] Foreign Application Priority Data Sep. 3, 1982 [JP] Japan .............................. 57-134430[U]
Oct. 18, 1982 [JP] Japan .............................. 57-157732[U]

[51] Int. Cl.$^3$ ............................................. F16H 55/30
[52] U.S. Cl. ......................................... 474/152; 74/457
[58] Field of Search ........................... 474/152; 74/457

[56] References Cited

U.S. PATENT DOCUMENTS 3,703,756 11/1972 Chesters .......................... 74/457 X
3,956,943 5/1976 Yamasaki ............................. 474/148
4,330,286 5/1982 Nagano ........................... 474/152 X

FOREIGN PATENT DOCUMENTS 1265045 4/1965 Fed. Rep. of Germany.
2758416 6/1978 Fed. Rep. of Germany.

*Primary Examiner*—Stephen J. Novosad
*Assistant Examiner*—Frank H. McKenzie, Jr.
*Attorney, Agent, or Firm*—Stevens, Davis, Miller & Mosher

[57] ABSTRACT

A sprocket for a bicycle comprising a sprocket body and a number of teeth provided circumferentially at the outer periphery of the sprocket body, teeth being shaped so that a length between the tooth crest of each tooth and the axis of rotation of the sprocket body, is made smaller than that between a phantom plane connecting both circumferential edges at the tooth crest and the axis of rotation, both the edges being acute-angled.

7 Claims, 10 Drawing Figures

SPROCKET FOR A BICYCLE

FIELD OF THE INVENTION

This invention relates to a sprocket for a bicycle. The sprocket which mainly constitutes a multi-stage sprocket for the rear wheel of a bicycle is provided circumferentially at the outer periphery of the sprocket body with a number of teeth engageable with a driving chain to thereby transmit a driving force from pedals to a rear wheel.

BACKGROUND OF THE INVENTION

Generally, a multi-stage sprocket comprising two or more sprockets with a different number of teeth is mounted to a rear hub of the bicycle so that a driving chain is moved axially of the sprocket by means of a derailleur and switched to a desired sprocket for transmitting the driving force to a rear wheel in a given speed change ratio.

The sprocket is formed of a steel plate punched by a punching mold. The portion of the mold corresponding to the crest of each tooth at the sprocket is formed in a circular arc with respect to the axis of rotation of sprocket, whereby the tooth crest of each tooth at the punched sprocket, as shown in FIG. 10, is convex with respect to the phantom plane connecting both circumferential edges C of the tooth along the addendum circle.

The driving chain, when switched from the smaller diameter sprocket to the larger diameter one at the sprocket assembly, is caught and raised by the edge C of the tooth at the larger diameter sprocket through the edge of an outer link plate or the end of a pin projecting therefrom at the chain brought into press contact with the lateral side of tooth at the larger diameter sprocket. When this occurs, a slip is generated between the convex tooth crest of the tooth at the larger diameter sprocket and the driving chain, so that a catch of the chain is inaccurate to delay engagement of the chain with the sprocket to that extent, resulting in a poor speed change efficiency. On the other hand, the chain, when switched from the larger diameter sprocket to the smaller diameter one, is raised to once ride on the tooth crest at the larger diameter sprocket and then engages with the teeth at the smaller diameter sprocket. When this occurs the chain riding on the convex tooth crest is not stable and may slip down therefrom.

Friction between the tooth crest and the chain riding thereon will cause considerable wear at both the circumferential edges. As a result, the curvature of the edge becomes larger, in other words, the roundness thereof becomes blunt, to reduce the convature of the convex tooth crest as a whole. Hence, the catch of the chain by the edge worsens and the chain riding on the tooth crest becomes further unstable.

SUMMARY OF THE INVENTION

In the light of the above problem, this invention has been designed. An object of the invention is to provide a sprocket for a bicycle, which can efficiently catch by the edge of tooth crest the chain when switched from the smaller diameter sprocket to the larger diameter one, keep in a stable condition the chain riding on the tooth crest when switched and vice versa, and maintain this effect even when the edges at the tooth crest wear out.

The sprocket for the bicycle of the invention comprises the sprocket body and a number of teeth provided circumferentially at the outer periphery of the sprocket body, the teeth being constructed as follows:

Each tooth includes a front side or front tooth surface, a rear side or rear tooth surface, a top side or tooth crest, a front edge between the front side and the top side, and a rear edge between the rear side and the top side. The length or the shortest interval between the top side and the axis of rotation of the sprocket is made smaller than that between a phantom plane connecting the front and rear edges and the axis of rotation. In addition the front and rear edges of each tooth are acute-angled.

A plurality of sprockets constructed as foregoing and with a different number of teeth are assembled to be mounted mainly to a rear hub.

For example, when two sprockets with a different number of teeth are used and the chain is switched by a derailleur from the smaller diameter sprocket to the larger diameter one, the acute-angled rear edge of the tooth at the latter efficiently catches the chain, thereby enabling the chain to be more quickly switched to the sprocket and improving speed change efficiency.

On the other hand, the chain, when switched from the larger diameter sprocket to the smaller diameter one, once rides on the top side of the tooth of the larger diameter sprocket constructed as described above and is kept thereon in a stable condition, thereby enabling quick switching of the chain to the desired sprocket, thus further improving the speed change efficiency.

Also, the top side of the tooth of the sprocket, even when worn out due to friction with the chain, can keep the front and rear edges not so blunt, thereby enabling an efficient catch of the chain by the edge and a stable ride of the same on the top side to be kept for a long time.

The face at the top side may be concave, recessed in a V-like shape, or flat. Besides this, it is preferable to provide, at the top side, a resistance means to apply a resistance against a slip of the chain.

Such resistance means further ensures a stable hold of the chain on the top side during the chain switching to thereby further improve speed change efficiency.

These and other objects of the invention will become more apparent in the detailed description and examples which follow.

DETAILED DESCRIPTION OF THE INVENTION

Figure 1:
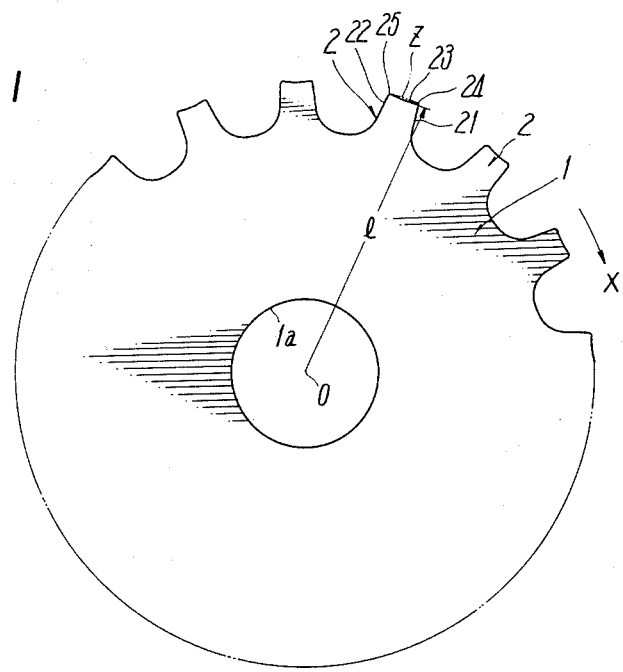
FIG. 1 is a front view of an embodiment of a sprocket of the invention.

Referring to FIG. 1, a ring-like sprocket body 1 has a center bore 1a and at the outer periphery a number of teeth 2 disposed circumferentially at regular intervals, the sprocket body 1 and teeth 2 being formed of a metallic plate punched by a punching mold. Alternatively, they may be molded by die casting.

Each tooth 2 is provided with a front side 21 and a rear side 22 positioned at the front and the rear with respect to the rotation direction of the arrow X respectively, and a top side 23 connecting the front and rear sides 21 and 22. A front edge 24 is formed between the front side 21 and the top side 23 and a rear edge 25 between the rear side 22 and the top side 23.

A length l or the shortest interval between the top side 23 and the axis O of rotation of sprocket body 1 is made smaller than that between the phantom plane Z including the front and rear edges 24 and 25 and the same, the front and rear edges being acute-angled.

Figure 2:
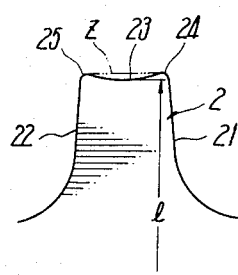
FIG. 2 is an enlarged view of a tooth in the FIG. 1 embodiment.
Figure 3:
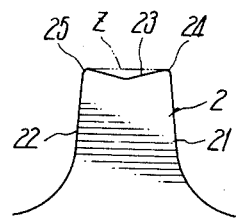
FIGS. 3 through 5 are partially enlarged views of modified embodiments of the invention.
Figure 4:
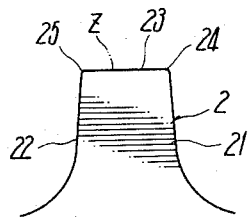

The top side 23, as enlarged in FIG. 2, is concaved in a circular arc toward the axis O of rotation of sprocket body 1, thereby keeping stable the chain riding on the top side 23 during the chain switching. Alternatively, the top side 23 may, for example as shown in FIG. 3, be recessed in a V-like shape toward the axis O of rotation, or, as shown in FIG. 4, be flat parallel to the phantom plane Z.

The front and rear edges 24 and 25, as shown in FIGS. 1 through 4, are slightly chamfered to be curved in a small curvature, or may be kept sharp without being chamfered.

Figure 5:
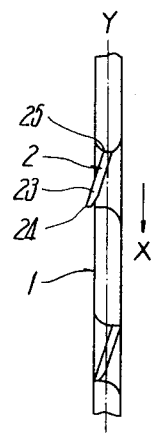
Figure 6:
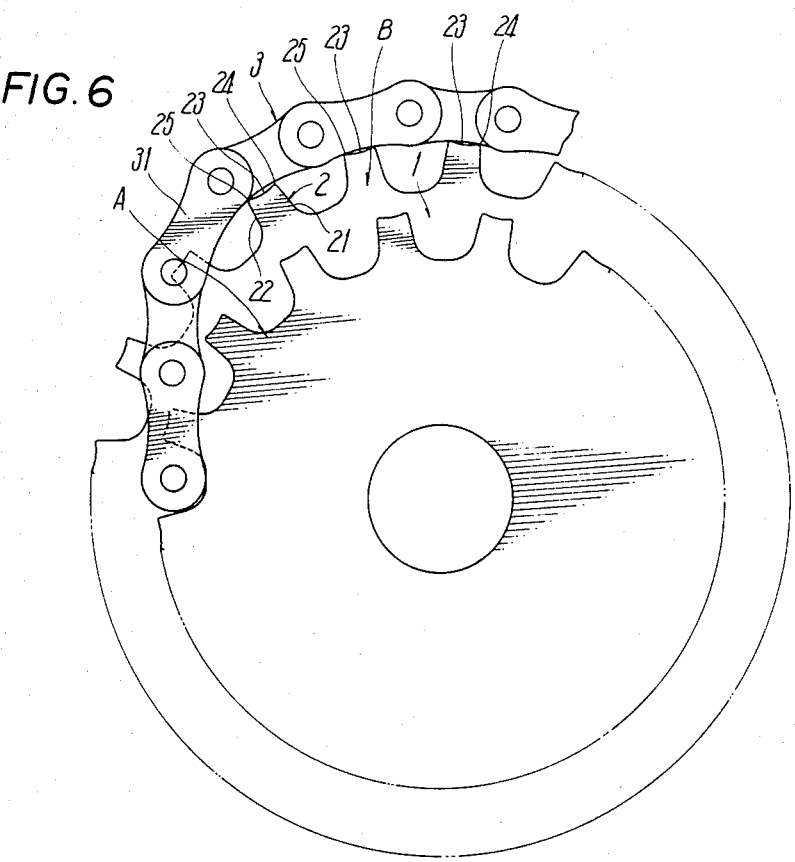
FIG. 6 is a view explanatory of engagement of a driving chain with the sprocket.

In addition, the teeth 2 are provided in parallel to the center line Y of thickness of sprocket body 1. Alternatively, the teeth 2 may, as shown in FIG. 5, be inclined at the predetermined angle with respect to the center line Y so that one circumferential end of the tooth crest may project axially outwardly from the tooth bottom land. In this case, the tooth projecting at the end of tooth crest from the bottom land is preferred to be chamfered at the front edge 24 and at the corner thereof at the center line Y side.

Next, explanation will be given on how to switch the chain to a desired sprocket of the sprocket assembly mounted to the rear hub of the bicycle, in which, for the convenience of explanation, the smaller diameter sprocket is designated by A and the larger diameter one by B.

The chain 3, when switched from the sprocket A to that B, is biased by a derailleur toward the sprocket B and a link plate 31 of chain 3 leaves the tooth of sprocket A and is brought into press contact with the side of tooth 2 at the sprocket B, so that the end of a pin projecting from link plate 31, or the side edge of an outer link plate of chain 3, is caught by the rear edge 25 of tooth 2 at the sprocket B, whereby the chain 3 is raised to engage with the tooth 2 at the sprocket B. At this time, the top side 23 of each tooth 2 at the sprocket B, which is concave below the aforesaid phantom plane Z, allows the rear edge 25 of tooth 2 at the sprocket B to efficiently catch the chain 3, thereby enabling quick engagement of chain 3 with the teeth of sprocket B and improving the speed change efficiency.

On the other hand, the chain 3, when switched from the sprocket B to that A, is biased by the derailleur toward the sprocket A and the chain 3 leaves the tooth 2 at the sprocket B and is raised therefrom, so that the link plate 31 of chain 3 rides on the top side 23 of tooth 2 at the sprocket B, at which time the top side 23 constructed as abovementioned can keep stable the chain 3 thereon. Hence, the chain 3 can quickly be switched to the sprocket A.

Also, the top side 23 of tooth 2 at the sprocket B, even when worn out due to friction between the chain 3 and the top side 23 during the chain switching, keeps the front and rear edges 24 and 25 not so blunt, thereby enabling the chain 3 to be caught efficiently by the edges 24 and 25 and kept stable on the top side 23 due to its construction as above-mentioned.

Figure 7:
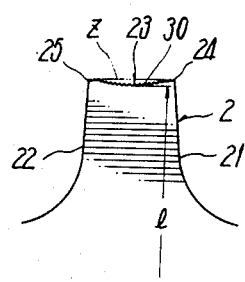
FIGS. 7 through 9 are partially enlarged views exemplary of improvements in the FIGS. 3 through 5 embodiments.

Alternatively, the top side 23 may, as shown in FIG. 7, be provided with a resistance means 30, to apply a resistance against a slip of chain 3.

The resistance means 30 comprises a number of minute protuberances extending thicknesswise of sprocket body 1 and juxtaposed thicknesswise of the tooth, thereby enabling the chain to be held stably on the top side 23 on which the chain is riding. Hence, the chain can be switched quickly to that extent.

Figure 8:
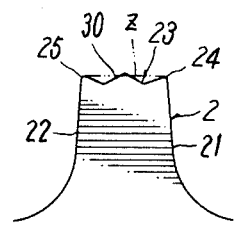
Figure 9:
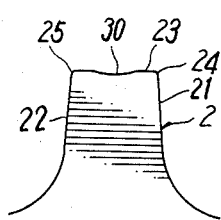
Figure 10:
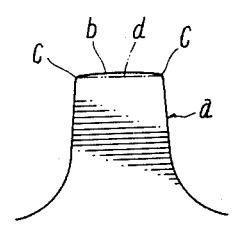
FIG. 10 is a partially enlarged veiw of a conventional sprocket.

The resistance means may alternatively be formed of only one protuberance as shown in FIG. 8, or replaced by one recess as shown in FIG. 9.

In addition, the embodiment in FIG. 8 provides one protuberance at the top side 23 in the FIG. 3 embodiment and that in FIG. 9 provides one recess at the top side 23 in the FIG. 4 embodiment.

Although several embodiments of the invention have been described, they are merely exemplary of the invention and not to be constructed as limiting, the invention being defined solely by the appended claims.

What is claimed is:

1. A sprocket for a bicycle comprising: a sprocket body and a number of teeth provided circumferentially at the outer periphery of said sprocket body and engageable with a driving chain at the bicycle, each of said teeth having, with respect to a rotation direction of said sprocket, a front side, a rear side and a top side, and having a front edge between said front side and said top side and a rear edge between said rear side and said front side, and being shaped so that a length between said top side and the axis of rotation of said sprocket body is smaller than that between a phantom plane connecting said front edge and rear edge and said axis of rotation, said front and rear edges being acute-angled respectively.

2. A sprocket for a bicycle according to claim 1, wherein said top side is formed in a concave face curved radially inwardly of said sprocket body and across said front and rear edges toward the axis of rotation of said sprocket body.

3. A sprocket for a bicycle according to claim 1, wherein said top side is formed in a sloping face in a V-like shape across said front and rear edges toward the axis of rotation of said sprocket body.

4. A sprocket for a bicycle according to claim 1, wherein said top side is formed in a flat face parallel to said phantom plane connecting said front and rear edges.

5. A sprocket for a bicycle according to claim 1, wherein said top side has a resistance means for applying a resistance against a slip of said chain.

6. A sprocket for a bicycle according to claim 5, wherein said resistance means comprises at least one recess extending thicknesswise of said sprocket body.

7. A sprocket for a bicycle according to claim 5, wherein said resistance means comprises at least one protuberance extending thicknesswise of said sprocket body.

* * * * *